US007419176B2

(12) United States Patent
Perk

(10) Patent No.: US 7,419,176 B2
(45) Date of Patent: Sep. 2, 2008

(54) STAND-UP WHEELCHAIR

(75) Inventor: Heinrich Perk, Aglasterhausen (DE)

(73) Assignee: Otto Bock HealthCare IP GmbH & Co. KG (DE)

( * ) Notice: Subject to any disclaimer, the term of this patent is extended or adjusted under 35 U.S.C. 154(b) by 239 days.

(21) Appl. No.: 11/462,904

(22) Filed: Aug. 7, 2006

(65) Prior Publication Data

US 2007/0045991 A1 Mar. 1, 2007

(30) Foreign Application Priority Data

Aug. 8, 2005 (DE) ...................... 10 2005 038 029

(51) Int. Cl.
*B62M 1/14* (2006.01)

(52) U.S. Cl. ............ 280/250.1; 280/304.1; 297/344.12; 297/344.15

(58) Field of Classification Search .............. 280/250.1, 280/304.1; 297/344.12, 344.15
See application file for complete search history.

(56) References Cited

U.S. PATENT DOCUMENTS

| | | | | |
|---|---|---|---|---|
| 5,096,008 | A * | 3/1992 | Mankowski | 180/6.5 |
| 5,556,121 | A * | 9/1996 | Pillot | 280/304.1 |
| 5,772,226 | A * | 6/1998 | Bobichon | 280/250.1 |
| 6,250,717 | B1 * | 6/2001 | Porcheron | 297/411.3 |
| 6,601,869 | B2 * | 8/2003 | Porcheron | 280/648 |
| 7,165,778 | B2 * | 1/2007 | Kuiken | 280/250.1 |
| 2002/0027334 | A1 * | 3/2002 | Porcheron | 280/250.1 |
| 2003/0146601 | A1 * | 8/2003 | Gutierrez | 280/650 |
| 2006/0012147 | A1 * | 1/2006 | Laffin | 280/304.1 |
| 2006/0061067 | A1 * | 3/2006 | Kuiken | 280/647 |

FOREIGN PATENT DOCUMENTS

| | | | |
|---|---|---|---|
| CA | 2458092 | A1 | 4/2003 |
| DE | 19912830 | A1 | 9/2000 |

* cited by examiner

*Primary Examiner*—J. Allen Shriver
*Assistant Examiner*—Tashiana Adams
(74) *Attorney, Agent, or Firm*—Faegre & Benson, LLP

(57) ABSTRACT

A stand-up wheelchair with a chassis, at which two drive wheels and at least a one guidable wheel is fastened, on which a stand-up unit with a seating surface, a backrest and at least one tiltable footrest is arranged, whereby reciprocally underneath the seating surface an upper longitudinal rail and a lower longitudinal rail are arranged, the upper longitudinal rail is firmly connected with the seating surface and both longitudinal rails are connected over four hinge points with their rear ends connected with a backrest, characterized by the fact that the rear ends of the longitudinal rails show a slot, in which the backrest can be longitudinally adjusted with their lower ends.

17 Claims, 5 Drawing Sheets

STAND-UP WHEELCHAIR

RELATED APPLICATIONS

This applications claims the benefit of German application DE 10 2005 038 029.8 filed on Aug. 8, 2005, the entire disclosure of which is hereby incorporated herein by reference.

BACKGROUND OF THE INVENTION

A prolonged seating posture of a wheelchair user may lead to the physical teardown of bodily functions, such as the lower extremities mobility, intestinal activity slowing down, as well as reduced and degraded blood circulation. In addition, seating poses the risk of bedsores. A stand-up wheelchair helps reduce these consequences by changing the body posture, as standing reduces the teardown of bodily functions. A stand-up wheelchair typically includes a tiltable seating surface that is installed with backrests and footrests onto a frame. The correct adjustment to the user's anatomical requirements is a very important criterion for the comfort which the wheelchair offers. The seat depth and lower leg ratio is determined based on the user's body dimensions. A stand-up chair is selected and manufactured from the standard program of a manufacturer according to the determined dimensions.

The user-specific manufactured stand-up chairs for small and large persons often lead with to an unsatisfactory comfort, since the standardized sizes of stand-up chairs are fitted to average body dimensions. Frequently, the adjustment shortcomings are only noticed indirectly by the user. Shearing movements between the body and the seating surface or an excessively strong knee pad superficial pressure may lead to the development of bedsores after a short utilization time.

Stand-up wheelchairs also offer the user the possibility of developing sports activities. For example, a handicapped person is able to play golf. In such a case it is particularly important that the wheelchair in the stand-up position offers high stability. So, for example, it is also a requirement that the footrest in the stand-up position rises from the ground on its supports. The backrest must stand parallel to the seating surface so it gives the golfer sufficient movement possibilities (torso rotation), in order to be able to produce a powerful swing.

In such a case, stand-up wheelchairs are often held ready and used by different users on the golf course. On people with an average size, custom fit stand-up wheelchairs cannot be used by handicapped people or only under significant comfort losses.

An aluminum adjustable stand-up wheelchair is described in CA 2 458 092. The seat depth can be changed with an adjustable backrest. Therefore the backrest is telescopically connected with the under frame of the seat. Telescopic tubes are not particularly functional in practical operation. In order to ensure stability, small tolerances are necessary. A frequent adjustment leads to deterioration. The telescopic tubes reciprocally arranged under the seating surface can tilt between each other. The backrest is then inclined against the seating surface and a safe straightening of the wheelchair is not possible. In addition, telescopic tubes are dirt susceptible, which is however unavoidable during sports activities.

What is needed, then, is a stand-up wheelchair that offers convenient adjustment to accommodate the user's size and activities.

SUMMARY

In one embodiment, the present invention is a stand-up chair with a frame that has attached two driving wheels and at least one guidable wheel, as well as a stand-up unit with a seating surface, a backrest and at least one pivoting feet support. On both sides beneath the seating surface is an upper longitudinal rail and a lower longitudinal rail that are connected between themselves over four articulated joints and to the backrest with their lower ends.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE DRAWINGS

Figure 1:
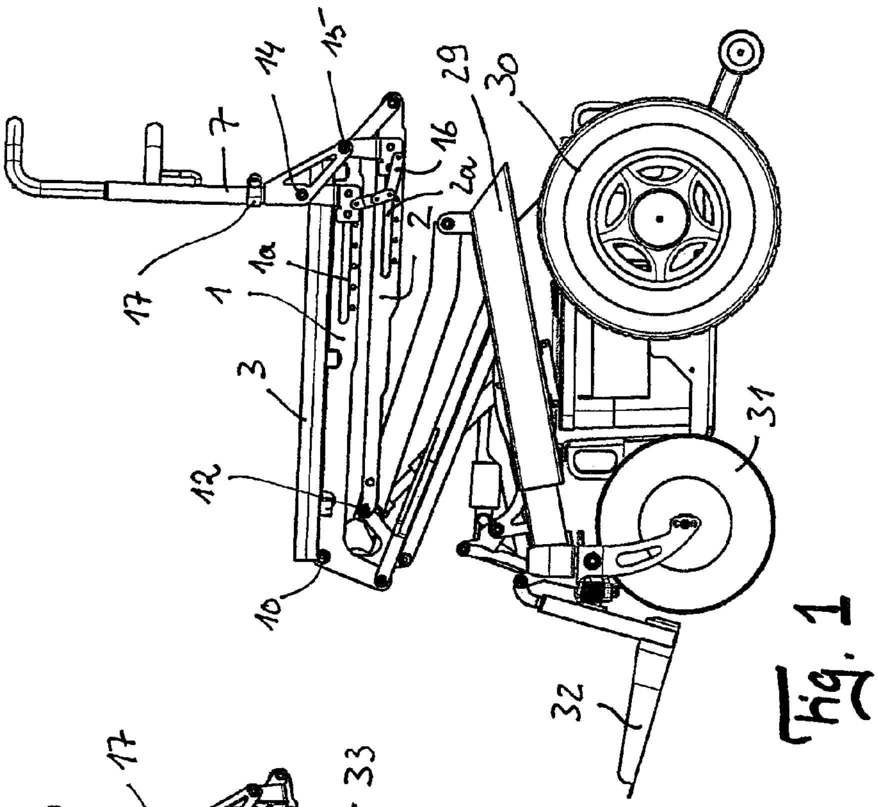
FIG. 1 shows a lateral view of a stand-up wheelchair according to one embodiment of the present invention.
Figure 2:
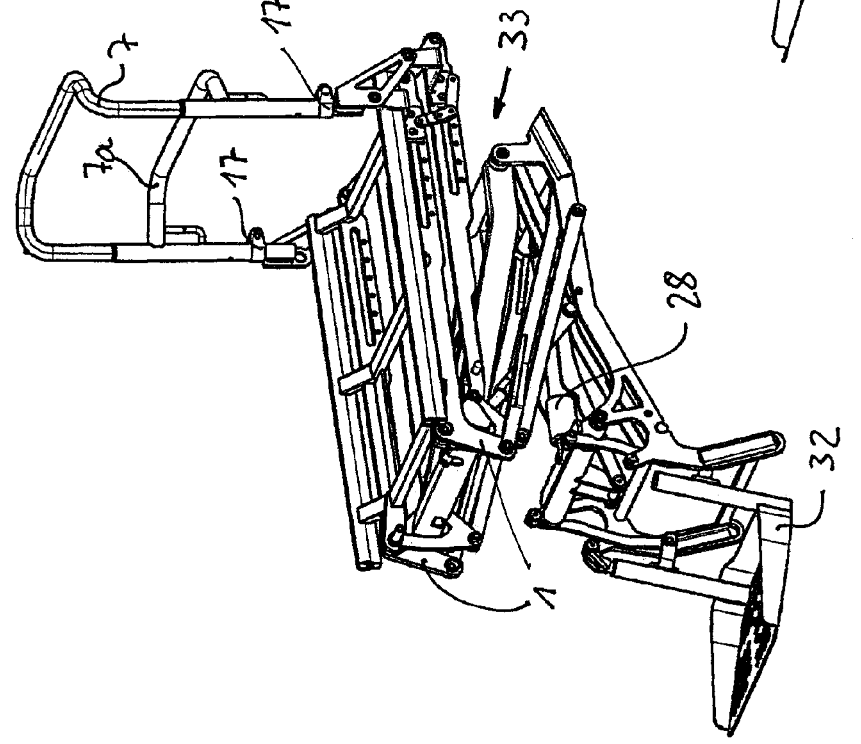
FIG. 2 shows a perspective view of a stand-up unit.
Figure 3:
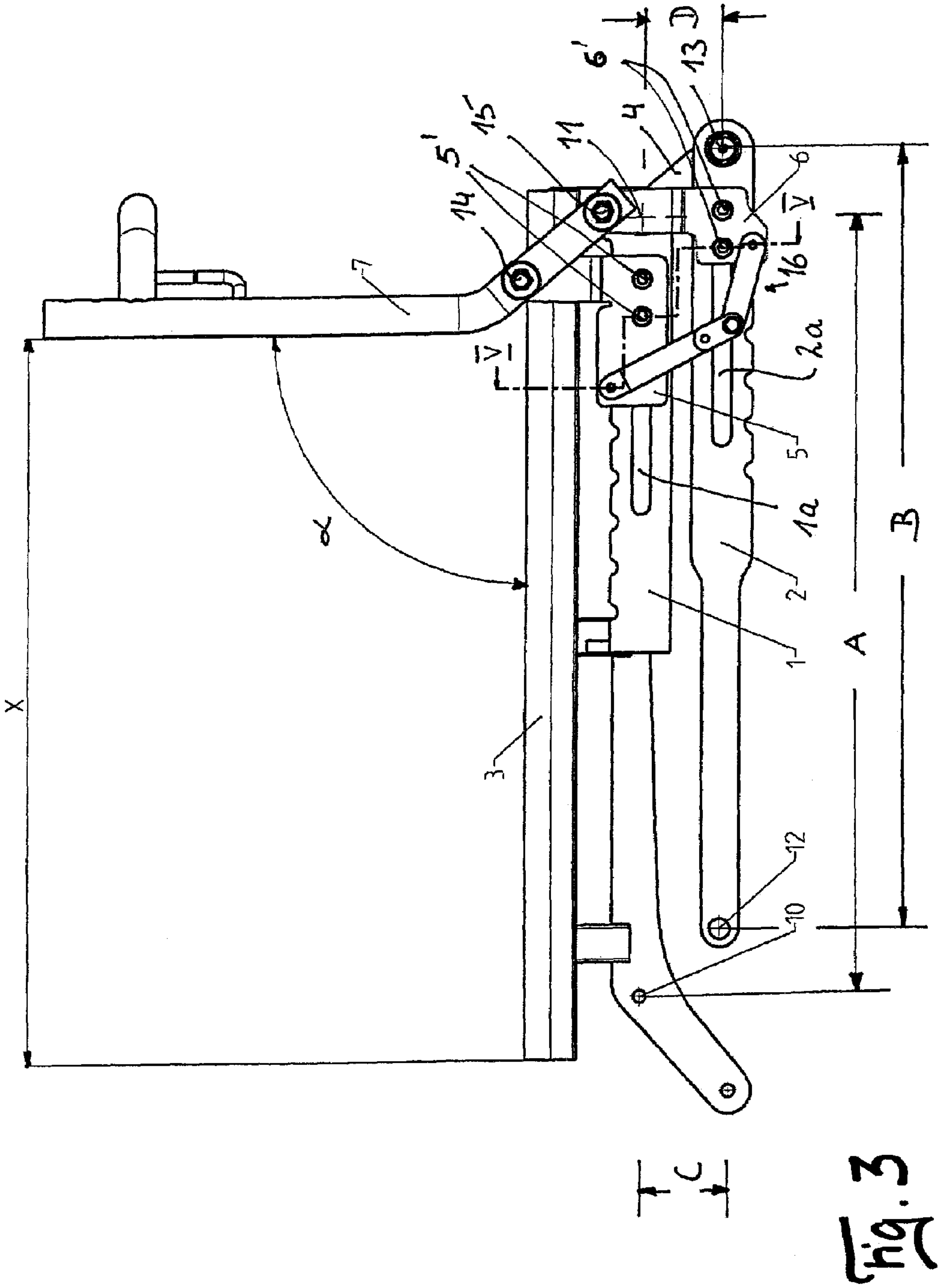
FIG. 3 shows a portion of the adjustment kinetics.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION OF THE INVENTION

A category compliant stand-up wheelchair is characterized by having the rear ends of the longitudinal rails show a slot, in which the backrest can be lengthwise adjusted. With this arrangement, the seat depth of the stand-up wheelchair is adjustable. Sliding over the slots is very durable and susceptible to little dirt.

As the backrest is fixable and adjustable over sliding blocks over the slots, small tolerances can be kept. The sliding blocks offer also the possibility of a stepless adjustment of the seat depth. Tilting the backrest is impossible, so that the rotating capability of the seating surface and the backrest is also guaranteed under napping conditions. Each sliding block preferably must be located in a plate which is connected by joints to the backrest. These plates can be connected by a joint grasp, so that in order to adjust the backrest, both grasp the seating surface laterally and with their help the backrest can be inserted in the slots.

It is convenient if the provided longitudinal rails are also arranged in the recesses parallel to the slots, in which the backrest can be connected to the standing indexing plungers. The indexing plungers can be arranged at the grasping elements. The recesses offer an advantage related to the indexing plungers, that the backrest can be prefixed before the sliding blocks are bolted in the slots. In addition they offer the advantage that the backrest can also be upheld if the screw connection of the sliding blocks is locked.

The recesses are preferably spaced regularly between each other, whereby a grid can be made for the backrest. Instead of recesses, drillings also may be intended. The rear ends of the longitudinal rails can be connected with one another by an articulated latch.

FIG. 1 shows a stand-up wheelchair according to one embodiment of the present invention. The wheelchair is formed by frame 29 with the stand-up unit 33 fastened to it, the drive wheels 30 and the two guidable front wheels 31. The stand-up unit 33 shows a seating surface 3, a backrest 7 and a footrest 32. The stand-up unit 33 can be swivelled over actuator 28. The seating surface 3 arrives to it in a vertical position. Backrest 7 maintains its vertical position and then stands to the seating surface 3. At the same time, by tipping the seating surface 3, footrest 32 is lowered and is supported in the stretched position of the stand-up unit 31 from the ground.

Two longitudinal rails 1, 2 are arranged beneath the seating surface 3. The upper longitudinal rail 1 is firmly connected with the seating surface 3 and shows a front hinge point 10 and a rear hinge point 11. The lower longitudinal rail 2 shows a front hinge point 12 and a rear hinge point 13. The upper longitudinal rail 1 and the lower longitudinal rail 2 are articulated connected over hinge points 10, 12, and 11, 13 respectively, whereby a joint parallelogram is constructed. This means that distance C of front hinge points 10, 12 is identical to distance D of rear hinge points 11, 13, while distance A of hinge points 10, 11 of the upper longitudinal rail is identical to distance B of hinge points 12, 13 of the lower longitudinal rail 2.

Figure 4:
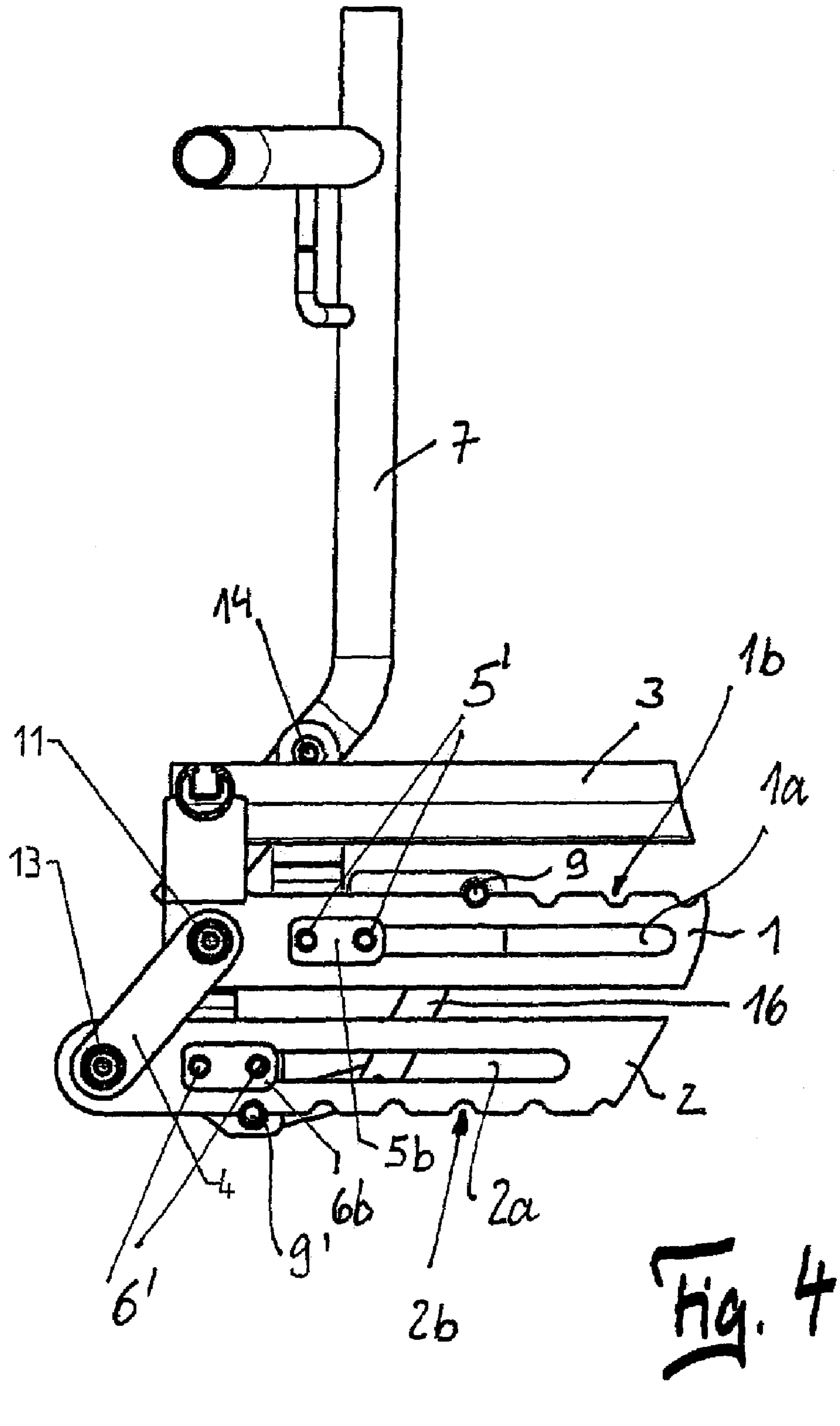
FIG. 4 shows a rear view of a portion of the adjustment kinetics of FIG. 3.
Figure 5:
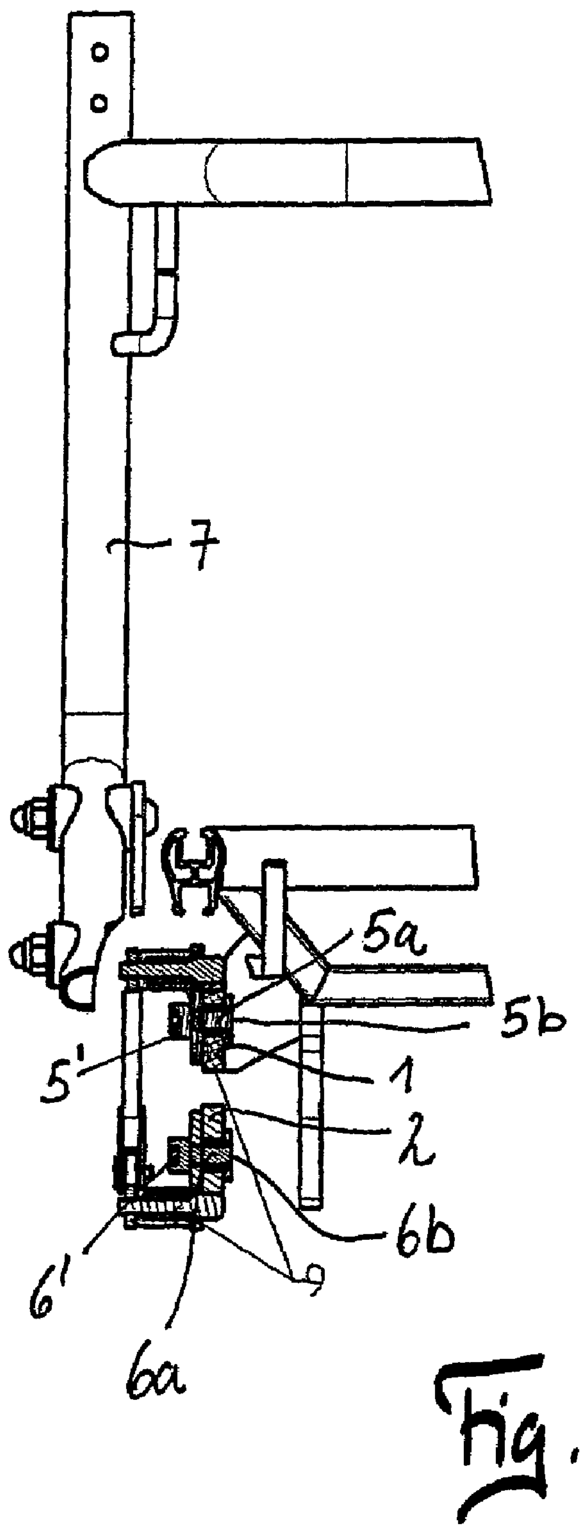
FIG. 5 shows a sectional view along the line V-V of FIG. 3.

Longitudinal rails 1, 2 show a lengthwise slot 1*a*, 2*a* in their rear areas, which is closed in its peripheral side. Sliding blocks 5*a*, 6*a* slide over slots 1*a*, 2*a* (see FIG. 5), which are respectively fastened to plates 5, 6. Sliding blocks 5*a*, 6*a* can be fixed over a clamping plate 5*b*, 6*b* in slots 1*a*, 2*a*, while plates 5, 6 can be strutted opposite longitudinal rails 1, 2. Backrest 7, which shows a cross beam 7*a*, is articulated fastened over joints 14, 15 at plates 5, 6. A grasp unit 16 consisting of three parts is fastened at the opposite end of plates 5, 6. At grasp unit 16, which is articulated fastened to plates 5, 6, an upper pin 9 and a lower pin 9' are arranged. Pins 9, 9' cooperate with recesses 1*b*, 2*b*, which are located at the top side of longitudinal rail 1 and at the lower surface of longitudinal rail 2, serving for sustaining backrest 7 in the longitudinal direction. The angle in which recesses 1 *b*, 2*b* effectively lie (see FIG. 4), corresponds to the angle of the distance between hinge points 10, 12 and 11, 13.

For adjusting backrest 7 and seat depth X, clamping plates 5*b*, 6*b* are tensed over screw connection 5', 6' with plates 5, 6, then both grasping units 16 are pulled together so that indexing plungers 9, 9' external contact with recesses 1*b*, 2*b* is pushed back to and backrest 7 can be moved the desired distance backwards or forwards. The indexing plungers are introduced into the appropriate recesses 1*b*, 2*b* and the screw connection 5', 6' is again tightened.

Figure 6:
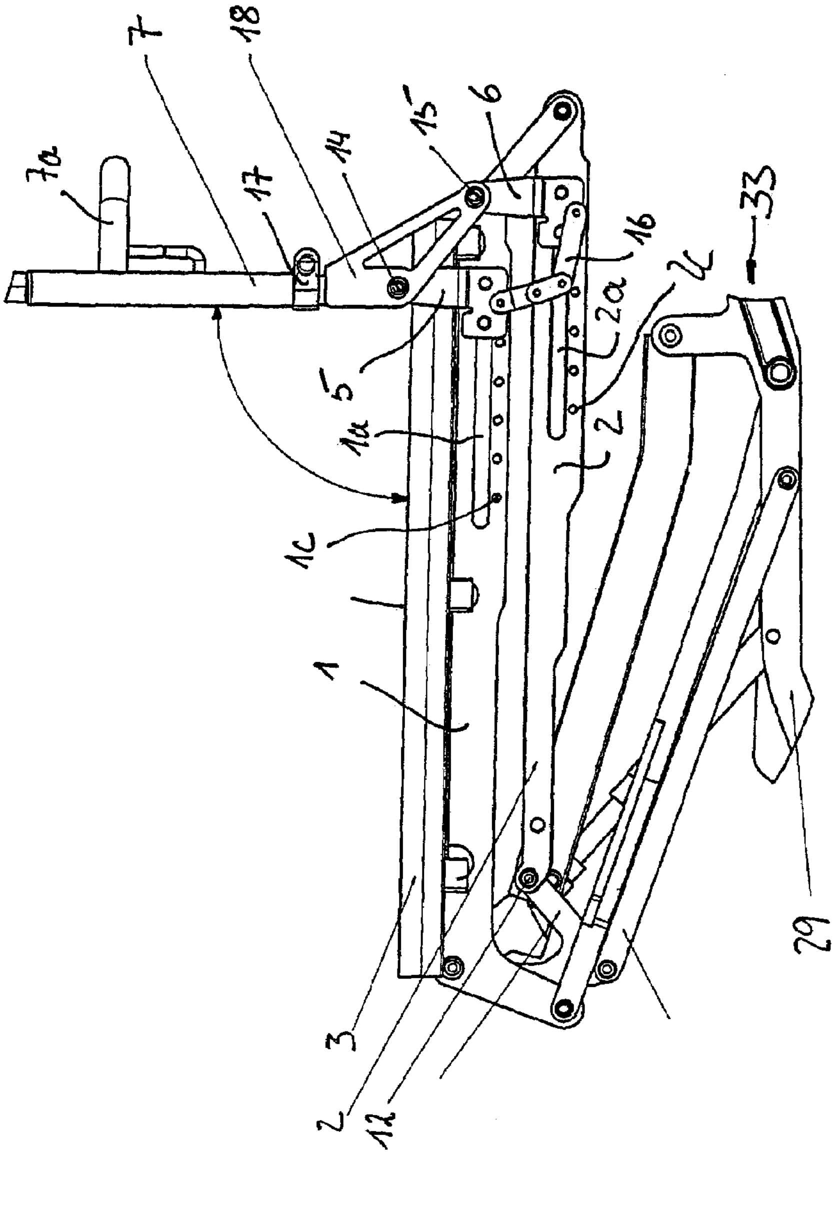
FIG. 6 shows a lateral view of the stand-up unit.

As FIG. 6 shows, instead of regularly spaced recesses 1 *b*, 2*b*, running boreholes 1*b*, 2*b* can also be intended underneath the slots, into which the indexing plungers 9, 9' may be inserted. Backrest 7 can be formed by two parts and be connected by two clips 17 with the stand-up unit 33. Such an arrangement has the advantage that the backrest 7 can be lightly and fast removed, if the stand-up wheelchair is to be transported in a motor vehicle, for example. It is also possible that seat depth X can be stopped by a stepless adjuster with the backrest.

The lower part of backrest 7 connected articulated with plates 5, 6 can be constructed as the single part of backrest 7 or arranged as a triangle joint 18. By changing one of distances D of hinge points 11, 13 and B of the hinge points 12, 13, angle A of backrest 7 relative to the seat face 3 can be stopped. Longitudinal rails 1, 2 can be articulated connected at their rear ends with flap 4.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A stand-up wheel chair comprising:

a frame attached to a couple drive wheels and at least one guidable wheel, to which a stand-up unit with a seating surface, a backrest and at least one footrest are pivotably arranged;

wherein on both sides of the stand-up unit an upper longitudinal rail and a lower longitudinal rail are fixed beneath the seating surface, wherein the upper longitudinal rails are connected to the seating surface and both the upper and lower longitudinal rails are connected at four joint points, wherein the rear ends of the upper and lower longitudinal rails are attached to said backrest, wherein the rear ends of the upper and lower longitudinal rails include a slot in which the backrest is longitudinally relocatable.

2. The stand-up wheel chair of claim 1, wherein the backrest is guided over sliding blocks in the slots and is fixable over the upper and lower longitudinal rails.

3. The stand-up wheel chair of claim 2, wherein each sliding block is arranged on a plate which is connected over a joint with the backrest.

4. The stand-up wheel chair of claim 1, wherein the longitudinal rails are provided with recesses arranged in parallel to the slots, in which the backrest can engaged with indexing plungers.

5. The stand-up wheel chair of claim 4, wherein the indexing plungers are arranged in a multiple part grasping unit.

6. The stand-up wheel chair of claim 5, wherein the parts of the grasping unit are connected to each other.

7. The stand-up wheel chair of claim 4, wherein the recesses are regularly spaced apart from one another.

8. The stand-up wheel chair of claim 1, wherein the rear ends of the upper and lower longitudinal rails are connected to each other.

9. The stand-up wheel chair of claim 1, wherein the longitudinal rails are provided with boreholes arranged in parallel with slots, in which the backrest can be engaged with the indexing plungers.

10. The stand-up wheel chair of claim 9, wherein the boreholes are regularly spaced apart from one another.

11. The stand-up wheel chair of claim 1, wherein the backrest is continuously adjustable.

12. A stand-up wheel chair comprising:

a frame attached to a couple drive wheels and at least one guidable wheel, to which a stand-up unit with a seating surface, a backrest and at least one footrest are pivotable arranged;

wherein on both sides of the stand-up unit an upper longitudinal rail and a lower longitudinal rail are fixed beneath the seating surface, wherein the upper longitudinal rails are connected to the seating surface and both the upper longitudinal rails are connected to the lower longitudinal rails so as to form a generally parallelogram shape, wherein the upper and lower longitudinal rails each includes a slot slidably coupled to the backrest.

13. The stand-up wheel chair of claim 12, wherein the backrest is guided over sliding blocks in the slots and is fixable over the upper and lower longitudinal rails.

14. The stand-up wheel chair of claim 12, wherein the longitudinal rails are provided with recesses arranged in parallel to the slots, in which the backrest can engaged with the indexing plungers.

15. The stand-up wheel chair of claim 12, wherein the backrest is continuously adjustable.

16. A stand-up wheel chair comprising:

a stand-up unit with a seating surface, a backrest and at least one footrest;

wherein on both sides of the stand-up unit an upper longitudinal rail and a lower longitudinal rail are fixed beneath the seating surface, wherein the upper longitudinal rails are connected to the seating surface and both the upper and lower longitudinal rails are connected at four joint points, wherein the rear ends of the upper and lower longitudinal rails are attached to a backrest, wherein the rear ends of the upper and lower longitudinal rails include a slot in which the backrest is longitudinally relocatable.

17. The stand-up wheel chair of claim 16 further comprising a frame attached to a couple drive wheels and at least one guidable wheel, to which the stand-up unit is pivotable arranged.

* * * * *